United States Patent
Yagi et al.

(10) Patent No.: US 7,193,954 B2
(45) Date of Patent: Mar. 20, 2007

(54) OPTICAL PICKUP DEVICE AND OBJECTIVE LENS FOR THE OPTICAL PICKUP DEVICE

(75) Inventors: Katsuya Yagi, Hino (JP); Yuichi Atarashi, Hachioji (JP); Tohru Kimura, Hachioji (JP); Kiyono Ikenaka, Hino (JP)

(73) Assignee: Konica Minolta Holding, Inc., Tokyo (JP)

( * ) Notice: Subject to any disclaimer, the term of this patent is extended or adjusted under 35 U.S.C. 154(b) by 556 days.

(21) Appl. No.: 10/805,730

(22) Filed: Mar. 22, 2004

(65) Prior Publication Data
US 2004/0190423 A1    Sep. 30, 2004

(30) Foreign Application Priority Data
Mar. 31, 2003  (JP) ............................. 2003-095182

(51) Int. Cl.
*G11B 7/00* (2006.01)
(52) U.S. Cl. ............................. 369/112.01; 369/112.05; 369/112.23; 369/44.23; 369/44.37
(58) Field of Classification Search ............ 369/44.23, 369/44.27, 44.37, 53.2, 53.22, 53.23, 112.01, 369/112.02, 112.03, 112.05, 112.23, 112.24
See application file for complete search history.

(56) References Cited

U.S. PATENT DOCUMENTS

| 5,729,510 A | * | 3/1998 | Kasahara et al. | 369/53.22 |
| 6,034,939 A | * | 3/2000 | Takasawa et al. | 369/112.17 |
| 6,370,104 B1 | * | 4/2002 | Chao et al. | 369/112.28 |
| 6,449,235 B1 | * | 9/2002 | Kim et al. | 369/112.01 |
| 6,545,958 B1 | * | 4/2003 | Hirai et al. | 369/53.19 |
| 6,650,612 B1 | * | 11/2003 | Matsuzaki et al. | 369/112.05 |
| 6,898,168 B2 | * | 5/2005 | Kimura et al. | 369/112.01 |
| 2003/0185136 A1 | * | 10/2003 | Kaiho et al. | 369/112.22 |

* cited by examiner

*Primary Examiner*—Thang V. Tran
(74) *Attorney, Agent, or Firm*—Cohen Pontani Lieberman & Pavane LLP

(57) ABSTRACT

An optical pickup apparatus includes first, second and third light sources; a light converging optical system including a first objective optical element and a second objective optical element, wherein the first objective optical element converges the light flux emitted from the first light source on a first information recording surface, the second objective optical element converges the light flux emitted from the third light source on a third information recording surface, and the first objective optical element or the second objective optical element converges the light flux emitted from the second light source on a second information recording surface; a lens holder holding the first objective optical element and the second objective element therein; and a chromatic aberration correcting element which corrects a chromatic aberration caused by a wavelength variation in a light flux emitted by the first light source.

32 Claims, 6 Drawing Sheets

FIG. 5(a) FIG. 5(b)
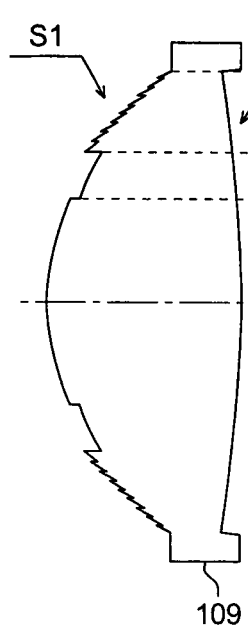
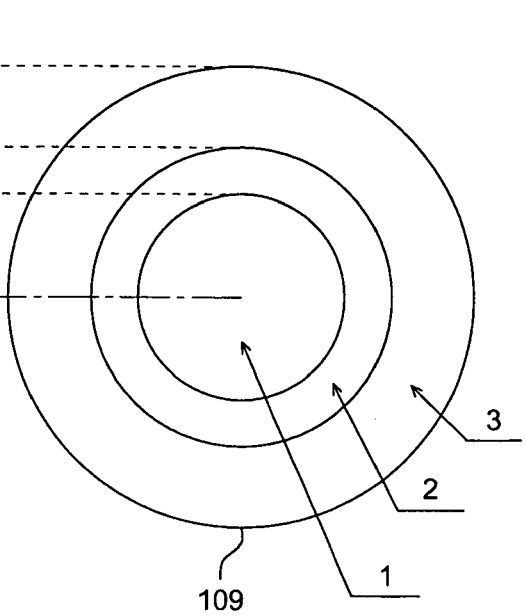
FIG. 6
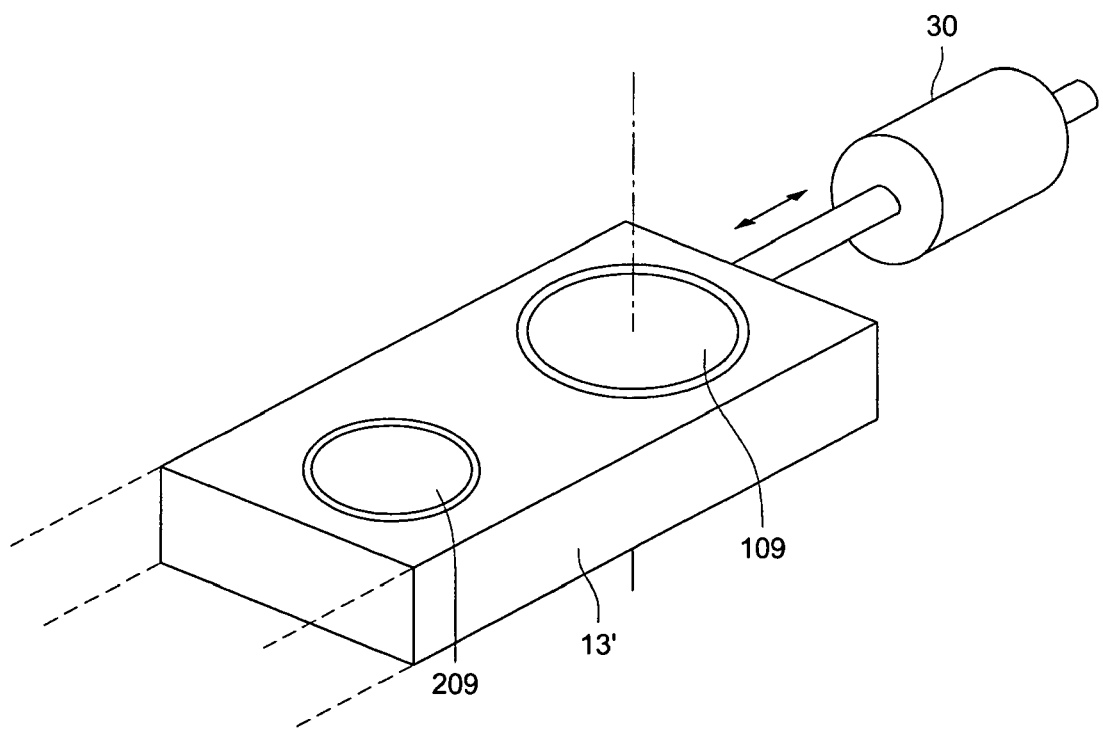

OPTICAL PICKUP DEVICE AND OBJECTIVE LENS FOR THE OPTICAL PICKUP DEVICE

BACKGROUND OF THE INVENTION

The present invention relates to an optical pickup device, and in particular, to an optical pickup device which can conduct recording and/or reproducing of information for each of three or more of different optical information recording media, by using each of three light fluxes emitted from three light sources each having a different wavelength.

In recent years, there have been advanced research and development of a high density optical disc system capable of conducting recording and/or reproducing of information by using a violet semiconductor laser having a wavelength of about 400 nm. As an example, on the optical disc (hereinafter, the optical disc of this kind is referred to as "high density DVD" in the present specification) conducting recording and/or reproducing of information under the specifications of NA 0.85 and light source wavelength 405 nm, it is possible to record information with 20–30 GB per one surface for an optical disc having a diameter of 12 cm that is the same as DVD (NA 0.6, light source wavelength 650 nm, storage capacity 4.7 GB) in size.

Incidentally, if it is only possible for the optical pickup device to conduct recording and/or reproducing information properly for the high density DVD mentioned above, a value of the optical pickup device as a product is not considered to be sufficient. At present, when taking into consideration the reality that DVD and CD wherein various types of information are recorded are marketed, only recording and/or reproducing of information properly for high density DVD is not sufficient, and an arrangement to be capable of conducting recording and/or reproducing of information properly in the same way also for conventional DVD or CD owned by a user, for example, leads to enhancement of a value of a product as an optical pickup device of a compatible type. From the background of this kind, a light-converging optical system used for an optical pickup device of a compatible type is required to have power for conducting recording and/or reproducing of information properly while keeping compatibility for all of the high density DVD, conventional DVD and CD.

For attaining low cost of an optical pickup device by simplifying its structure, in this case, it is preferable originally that a light-converging optical system including an objective lens is single even for an optical pickup device having compatibility. However, aberration characteristics of an objective lens in recording and/or reproducing of information for high density DVD are required to be extremely high because of a shorter wavelength for the light source and of employment of high NA, and it is sometimes difficult to conduct recording and/or reproducing of information for DVD and CD by using the same objective lens.

With respect to high density DVD, in particular, there are actual circumstances that detailed standards are not fixed, although the wavelength to be used is roughly determined because a light source that can be used is limited. Therefore, with respect to an objective lens used for recording and/or reproducing of information for high density DVD, it is necessary to leave room for redundancy of design to a certain extent, and in this case, it is more difficult to conduct recording and/or reproducing of information properly by using the same objective lens for three or more types of optical information recording media even for DVD and CD.

In contrast to this, TOKKAIHEI No. 11-296890 discloses an example of an optical pickup device that can conduct recording and/or reproducing of information for three or more types of optical information recording media by using a plurality of objective lenses.

Though it is impossible to understand clearly a type of a light-converging optical system provided in an optical pickup device, by reading drawings and descriptions, in TOKKAIHEI No. 11-296890, there is no disclosure about how to take actions for chromatic aberration caused in the case of converging a light flux emitted from a light source having a short wavelength, to say the least of it. Namely, TOKKAIHEI No. 11-296890 is one that discloses nothing about a technology capable of conducting recording and/or reproducing of information properly for three optical information recording media representing high density DVD, DVD and CD each being different in terms of information density.

SUMMARY

The invention has been achieved in view of the problems mentioned above, and its aspect is to provide an optical pickup device capable of conducting recording and/or reproducing of information properly for all of the high density DVD, conventional DVD and CD, for example.

The optical pickup device described in Item 1 is one having therein a first light source with wavelength $\lambda 1$, a second light source with wavelength $\lambda 2$ ($\lambda 1 < \lambda 2$), a third light source with wavelength $\lambda 3$ ($\lambda 2 < \lambda 3$) and a light-converging optical system including a first objective optical element and a second objective optical element, wherein it is possible to conduct recording and/or reproducing of information by converging a light flux emitted from the first light source, through the first objective optical element, on an information recording surface of the first optical information recording medium having first information recording density D1, through a protective layer with thickness t1, it is possible to conduct recording and/or reproducing of information by converging a light flux emitted from the third light source, through the second objective optical element, on an information recording surface of the third optical information recording medium having third information recording density D3 (D1>D3), through a protective layer with thickness t3 (t1<t3), it is possible to conduct recording and/or reproducing of information by converging a light flux emitted from the second light source, through the first objective optical element or the second objective optical element, on an information recording surface of the second optical information recording medium having second information recording density D2 (D1>D2>D3), through a protective layer with thickness t2 (t2<t3), and there are further provided a lens holder that holds the first objective optical element and the second objective optical element and a chromatic aberration correcting element that corrects the chromatic aberration caused by wavelength fluctuations of a light flux emitted from the first light source in the optical path through which the light flux emitted from the first light source passes.

In the foregoing structure, by using the first objective optical element exclusively for the first optical information recording medium, or by using it in combination for the first optical information recording medium and the second optical information recording medium, it is possible to leave room for redundancy of design thereof, compared with an occasion where the first objective optical element is used in combination for three types of optical information recording media, and thereby to conduct recording and/or reproducing of information properly even when environmental conditions are changed. It is further possible to conduct recording and/or reproducing of information properly even for any of three types of optical information recording media each being different in terms of information density, because the chromatic aberration correcting element is provided for correcting chromatic aberration in the case of using the first optical information recording medium. Now, the reason for chromatic aberration correction will be explained. When the power of a light flux (laser) is enhanced, wavelength fluctuations are caused, resulting in a fear that formation of a light-converged spot is affected. This problem shows a tendency not to be ignored when a working wavelength is short, although it can be ignored when the working wavelength is relatively long. In particular, the problem is conspicuous in the case of the so-called blue light source whose wavelength is in the vicinity of 400 nm. In foregoing structure, therefore, this problem has been solved by arranging a correction element for correcting longitudinal chromatic aberration that is caused when the working wavelength is fluctuated (in the case of the so-called mode hop), in an optical path, concerning specially a light source having a short wavelength.

BRIEF DESCRIPTION OF THE DRAWINGS

FIG. 5(*a*) is a sectional view of objective lens 109 and FIG. 5(*b*) is a front view thereof.

FIG. 6 is a schematic perspective view of another objective lens actuator device.

DETAILED DESCRIPTION OF THE PREFERRED EMBODIMENT

Figure 1:
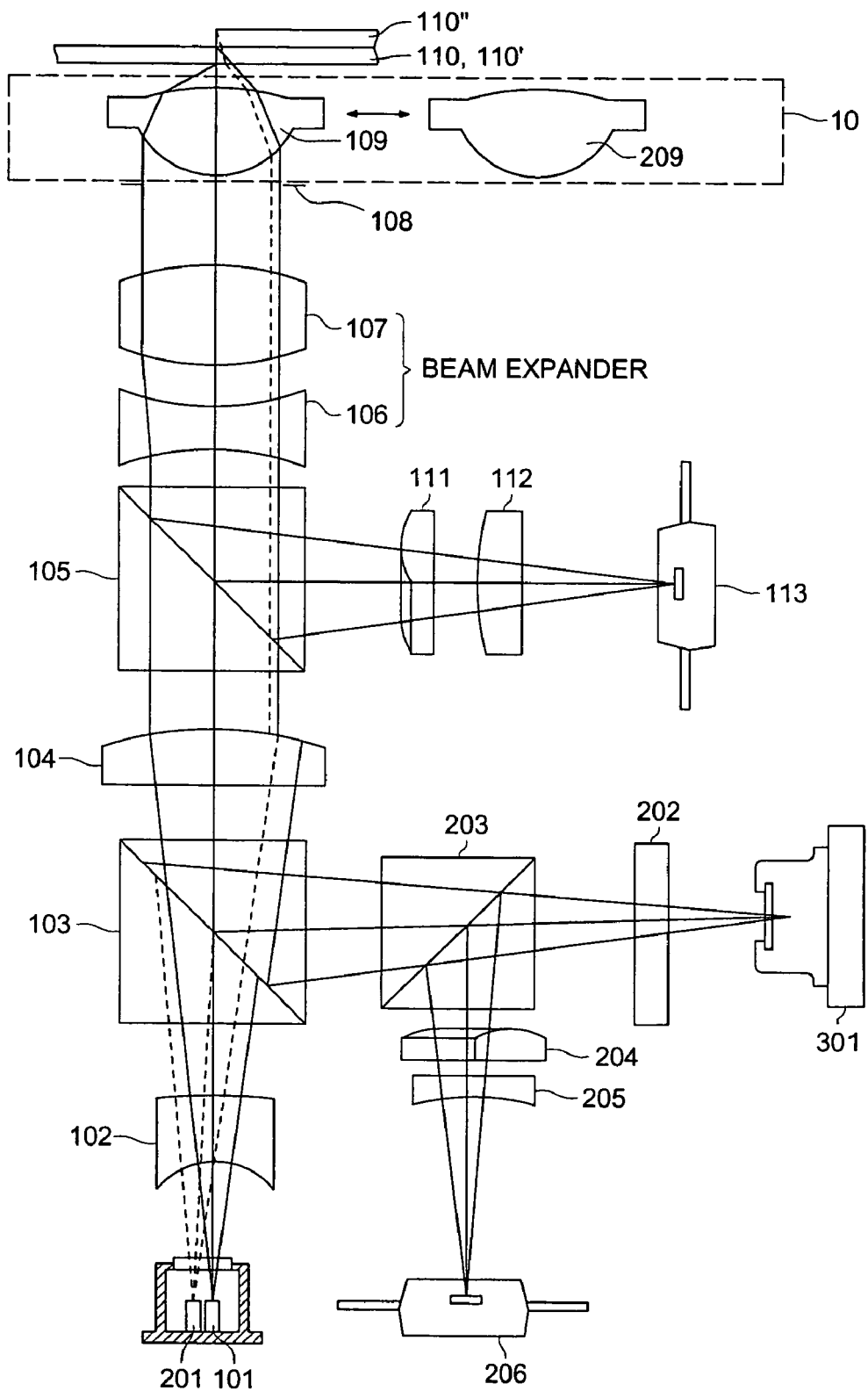
FIG. 1 is a schematic sectional view of an optical pickup device relating to the first embodiment.

Hereinafter, the preferable structures of the invention will be explained.

The optical pickup device described in Item 2 is the optical pickup device described in Item 1, wherein a light flux emitted from the first light source enters the first objective optical element in a form of a parallel light flux, and thereby, recording and/or reproducing of information can be conducted properly for the first optical information recording medium which generally has the severest tolerance limits for the light-converged spot.

The optical pickup device described in Item 3 is the optical pickup device described in Item 2, wherein a light flux emitted from the second light source enters either one of the first objective optical element or the second objective optical element, and thereby, recording and/or reproducing of information can be conducted properly even for the second optical information recording medium which generally has the second severest tolerance limits.

The optical pickup device described in Item 4 is the optical pickup device described in Item 1 or in Item 2, wherein a light flux emitted from the second light source enters either one of the first objective optical element or the second objective optical element in a form of a divergent light flux.

The optical pickup device described in Item 5 is the optical pickup device described in either one of Item 1–Item 4, wherein a light flux emitted from the third light source enters the second objective optical element in a form of a parallel light flux.

The optical pickup device described in Item 6 is the optical pickup device described in either one of Item 1–Item 4, wherein a light flux emitted from the third light source enters the second objective optical element in a form of a divergent light flux.

The optical pickup device described in Item 7 is the optical pickup device described in either one of Item 1–Item 8, wherein the chromatic aberration correcting element is constituted when at least one of a diffractive structure, a phase structure and a multi-level structure is formed on an optical surface. The "multi-level structure" is a diffractive structure that is formed stepwise wherein a diffractive structure is superposed on a diffractive structure, without being a serrated diffractive structure. Specifically, it means the structure described in TOKKAIHEI No. 9-306018.

The optical pickup device described in Item 8 is the optical pickup device described in either one of Item 1–Item 7, wherein the lens holder makes it possible for the first objective optical element or the second objective optical element to be inserted into an optical path of the light-converging optical system selectively, and thereby, the two different objective optical elements can be used for different purposes as occasion demands.

The optical pickup device described in Item 9 is the optical pickup device described in either one of Item 1–Item 8, wherein the lens holder holds the first objective optical element and the second objective optical element so that relative displacement between them may be made impossible.

The optical pickup device described in Item 10 is the optical pickup device described in either one of Item 1–Item 8, wherein the lens holder holds the first objective optical element and the second objective optical element so that relative displacement between them may be made possible.

The optical pickup device described in Item 11 is the optical pickup device described in either one of Item 8–Item 10, wherein the lens holder rotates around an axis that is in parallel with an optical axis.

The optical pickup device described in Item 12 is the optical pickup device described in either one of Item 8–Item 10, wherein the lens holder moves in the direction that intersects an optical axis.

The optical pickup device described in Item 13 is the optical pickup device described in either one of Item 1–Item 12, wherein the first light source, the second light source and the third light source are arranged to be different in terms of a distance from the objective optical element arranged in the optical path of the light-converging optical system.

The optical pickup device described in Item 14 is the optical pickup device described in either one of Item 1–Item 12, wherein at least two of the first light source, the second light source and the third light source are arranged to be the same in terms of a distance from the objective optical element arranged in the optical path of the light-converging optical system (for example, the so-called two-laser one package or three-laser one package).

The optical pickup device described in Item 15 is the optical pickup device described in either one of Item 1–Item 14, wherein the first objective optical element is composed of a single optical element and/or the second objective optical element is composed of a single optical element.

The optical pickup device described in Item 16 is the optical pickup device described in either one of Item 1–Item 15, wherein the first objective optical element is composed of a plurality of optical elements and/or the second objective optical element is composed of a plurality of optical elements.

The optical pickup device described in Item 17 is the optical pickup device described in either one of Item 1–Item 16, wherein the first objective optical element and/or the second objective optical element is made of glass material. Incidentally, when the first objective optical element and/or the second objective optical element is composed of plural elements, it is sufficient that at least one element is made of glass material.

The optical pickup device described in Item 18 is the optical pickup device described in either one of Item 1–Item 16, wherein the first objective optical element and/or the second objective optical element is made of plastic material. Incidentally, when the first objective optical element and/or the second objective optical element is composed of plural elements, it is sufficient that at least one element is made of plastic material.

The optical pickup device described in Item 19 is the optical pickup device described in either one of Item 1–Item 18, wherein there is provided a means to change a numerical aperture of the objective optical element.

The optical pickup device described in Item 20 is the optical pickup device described in either one of Item 1–Item 19, wherein there is provided a means to suppress deterioration of spherical aberration caused by temperature changes of the objective optical element.

The optical pickup device described in Item 21 is the optical pickup device described in either one of Item 1–Item 20, wherein thickness t1 of a protective layer of the first optical information recording medium is not less than 0.09 mm and is not more than 0.11 mm.

The optical pickup device described in Item 22 is the optical pickup device described in Item 21, wherein it is possible to conduct recording and/or reproducing of information by converging, through the first objective optical element, a light flux emitted from the first light source on an information recording surface of a fourth optical information recording medium having the fourth information recording density D4 (D4>D2) through a protective layer with thickness t4 (0.55 mm$\leq$t4$\leq$0.65 mm). In this case, an optical pickup device of the invention can conduct recording and/or reproducing of information for four optical information recording media each being different in terms of information recording density.

The optical pickup device described in Item 23 is the optical pickup device described in either one of Item 1–Item 20, wherein thickness t1 of a protective layer of the first optical information recording medium is not less than 0.55 mm and is not more than 0.65 mm.

The objective optical element in the present specification means, in a narrow sense, an optical element having a light-converging function arranged to be closest to the first optical information recording medium to face it under the condition that an optical information recording medium is loaded in the optical pickup device, and it means, in a broad sense, an optical element capable of being operated together with the aforesaid optical element in a narrow sense by an actuator at least in its optical axis direction. Therefore, numerical aperture NA of the optical element on the optical information recording medium side (image side) in the present specification means numerical aperture NA of the surface of the optical element positioned to be closest to the optical information recording medium. Further, necessary numerical aperture NA in the present specification shows a numerical aperture specified by the standard of each optical information recording medium, or it shows a numerical aperture of the objective optical element having diffraction limit capacity with which a spot diameter necessary for recording or reproducing information can be obtained in accordance with a wavelength of the light source to be used, for each optical information recording medium.

In the present specification, the first optical information recording medium and the fourth optical information recording medium mean optical discs of a high density DVD system each having different specification, for example, and the second optical information recording medium includes optical discs of various DVD systems such as DVD-RAM, DVD-R and DVD-RW serving as reproducing and recording, in addition to DVD-ROM and DVD-Video used for reproducing only.

(First Embodiment)

The invention will be explained in a more detailed way as follows, referring to the drawings. FIG. 1 is a schematic sectional view of an optical pickup device relating to the First Embodiment capable of conducting recording and/or reproducing of information for all of high density DVD (which is also called a first optical disc), conventional DVD (which is also called a second optical disc) and CD (which is also called a third optical disc).

Figure 2:
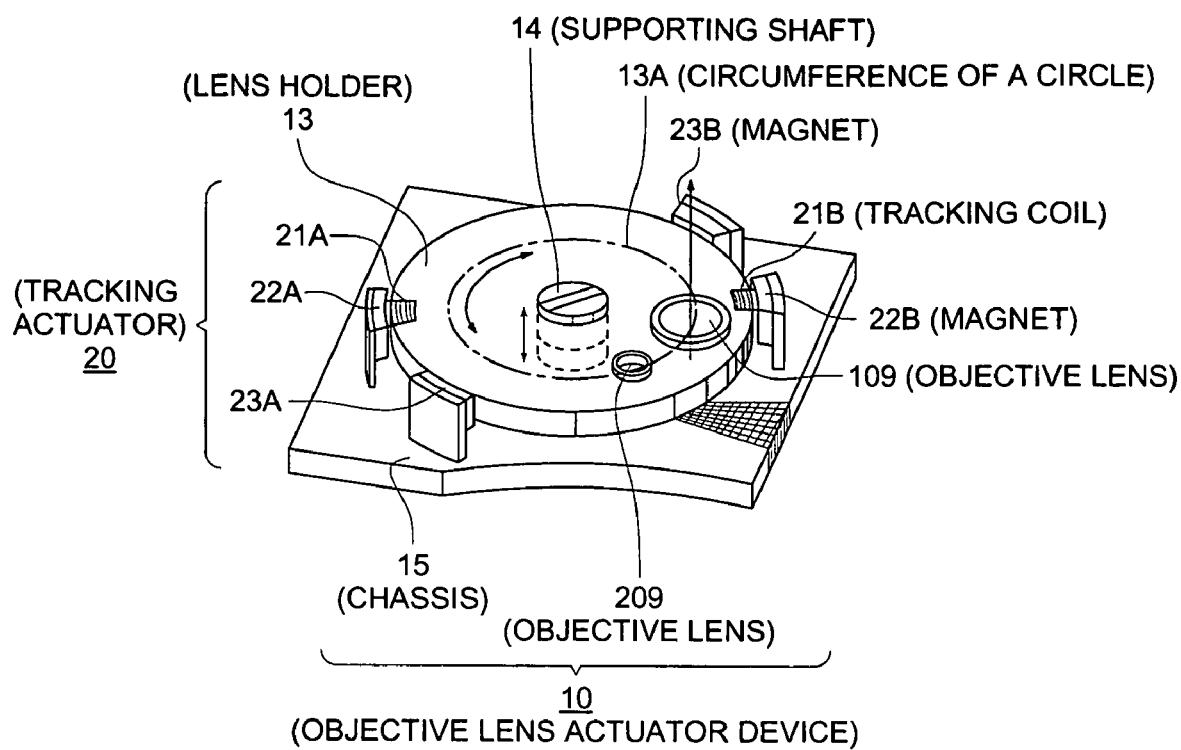
FIG. 2 is a perspective view of an objective lens actuator device used for the optical pickup device.

Further, FIG. 2 is a perspective view of an objective lens actuator device used for the optical pickup device of the present embodiment. First, the objective lens actuator device will be explained, to begin with. Objective lens actuator device 10 shown in FIG. 2 is composed of objective lens 109 (first objective optical element) that is arranged on the optical pickup device shown in FIG. 1 and converges a laser beam emitted from the semiconductor laser described later respectively on information recording surfaces of different optical discs, objective lens 209 (second objective optical element), lens holder 13 that holds optical axes of the objective lenses 109 and 209 on the same circumference 13A, chassis 15 that holds the lens holder 13 through supporting shaft 14 provided at the position of the central axis of the circumference 13A, rotatably and on a manner of movable back and forth along a central axis of the rotation, a focusing actuator (not shown) that makes the lens holder 13 to reciprocate in the direction along the supporting shaft 14 and tracking actuator 20 that urges the lens holder 13 to rotate for positioning each objective lens 109 and 209. On the objective lens actuator device 10, there is provided an operation control circuit (not shown) that controls operation of each actuator.

The objective lenses 109 and 209 are provided respectively in through holes formed on the flat surface of the lens holder 13, and they are arranged to be the same in terms of a distance from the center of the lens holder 13. The lens holder 13 is engaged rotatably, at its central portion, with the top end portion of the supporting shaft 14 studded on the chassis 15, and an unillustrated focusing actuator is provided on the lower portion of the supporting shaft 14.

Namely, the focusing actuator 20 uses a permanent magnet provided on the lower end portion of the supporting shaft 14 and a coil provided around the permanent magnet to construct an electromagnetic solenoid, and by adjusting an electric current that flows through the coil, reciprocating movement in a microscopic unit in the direction (vertical direction in FIG. 2) along the supporting shaft 14 is urged for the supporting shaft 14 and lens holder 13, thus, a focal length is adjusted.

As stated above, the lens holder 13 is given rotating movements around the supporting shaft 14 having an axial line which is in parallel with an optical axis, by tracking actuator 20. This tracking actuator 20 is equipped with a pair of tracking coils 21A and 21B which are provided on the edge portion of the lens holder 13 to be symmetric with the supporting shaft 14 between, and with two pairs of magnets including a pair of magnets 22A and 22B and a pair of magnets 23A and 23B which are provided in the vicinity of the edge portion of the lens holder 13 to be symmetric with the supporting shaft 14 on the chassis 15 between.

When the tracking coils 21A and 21B face respectively the magnet 22A and the magnet 22B both forming a pair on one side, positions of the magnets 22A and 22B are established so that objective lens 109 may be on the optical path of the laser beam reflected on reflection mirror 16, while, when the tracking coils 21A and 21B face respectively the magnet 23A and the magnet 23B, positions of the magnets 23A and 23B are established so that objective lens 209 may be on the optical path of the laser beam.

Further, on the lens holder 13, there is provided an unillustrated stopper which restricts a range of rotation so that the tracking coil 21A may not face the magnet 22B or magnet 23B and the tracking coil 21B may not face the magnet 22A or magnet 23A.

Further, the tracking actuator 20 is arranged so that the direction of a tangent on the outer circumferential surface of circular lens holder 13 may be perpendicular to the direction of a tangent on the track of an optical disc, and it is one for correcting the deviation of the irradiation position for the track of the laser beam, by urging rotating movements in a microscopic unit for the lens holder 13. Therefore, for conducting this tracking operation, it is necessary for each of tracking coils 21A and 21B to urge the lens holder 13 delicately to rotate while keeping the condition to face each of the magnets 22A and 22B.

For conducting this tracking operation, there is provided an arrangement wherein there is provided a piece of iron inside each of the tracking coils 21A and 21B, and an operation control circuit controls to flow an electric current through each of tracking coils 21A and 21B so that this piece of iron may produce delicate repulsive force between itself and each magnet while being attracted to each magnet.

Next, a main body of the optical pickup device will be explained. In the present embodiment, when conducting recording and/or reproducing of information for the first optical disc 110 and the second optical disc 110', lens holder 13 of objective lens actuator mechanism 10 is rotated, and objective lens 109 is inserted in an optical path as shown in FIG. 1. Namely, in the present embodiment, the objective lens 109 is used for the first optical disc 110 and the second optical disc 110' in common. Further, the first semiconductor laser 101 and the second semiconductor laser 201 are mounted on the same base board to constitute a single unit that is called the so-called two-laser one package.

First, a light flux emitted from first semiconductor laser 101 (wavelength $\lambda 1$=380 nm–450 nm) serving as a first light source is corrected by beam shaper 102 in terms of a beam shape, then, passes through first beam splitter 103, and is collimated by collimator 104 to be a parallel light flux, and after that, it passes through second beam splitter 105 and enters a beam expander having optical elements 106 and 107. Beam expanders (106 and 107) wherein at least one (preferably, optical element 106) can move in the direction of an optical axis have functions to change (enlarges, in this case) a diameter of a light flux of the parallel light flux, and to correct chromatic aberration and spherical aberration. In particular, on the optical surface of the optical element 107 on the other side of the beam expander, there is formed a diffractive structure (diffractive ring-shaped zone) which corrects chromatic aberration for a light flux emitted from the first semiconductor laser 101. The diffractive structure for correcting chromatic aberration may also be provided on another optical element (collimator 104), in addition to the optical element 107. Incidentally, the function to correct chromatic aberration can also be achieved by a phase structure or a multi-level, in place of the diffractive structure.

By providing the beam expanders (106 and 107) as stated above, chromatic aberration and spherical aberration can be corrected, and when high density DVD, for example, has two layers of information recording surfaces, it is also possible to select the information recording surface by moving the optical element 106 in the direction of an optical axis. Incidentally, a chromatic aberration correcting optical element and a means to control spherical aberration may also be objective lenses 109 (209) each having thereon a diffractive structure, without being the beam expanders (106 and 107).

In FIG. 1, a light flux which has passed through beam expanders (106 and 107) passes through diaphragm 108, and is converged, by objective lens 109 representing an objective optical element composed only of a refracting interface, on an information recording surface through a protective layer (thickness t1=0.1 mm–0.7 mm) of the first optical disc 110 to form a light-converged spot. Incidentally, for the objective lens 109, it is possible to use an inexpensive plastic material as a material of the objective lens 109, although glass may also be used as a material, because deterioration by spherical aberration caused by environmental changes can be corrected optionally by beam expanders (106 and 107) and thereby a restriction for optical characteristics required can be eased.

The light flux modulated by information pits and reflected on the information recording surface passes again through objective lens 109, diaphragm 108 and beam expanders (107 and 106), to be reflected on the second beam splitter 105, then, is given astigmatism by cylindrical lens 111, and passes through sensor lens 112 to enter a light-receiving surface of photodetector 113, and therefore, its output signals are used to obtain the scale reading of the information recorded on the first optical disc 110.

Further, changes in a quantity of light caused by changes in a form and a position of a spot on the photodetector 113 are detected to conduct focusing detection and tracking detection. Based on the detection, a focusing actuator (not shown) and tracking actuator 20 of objective lens actuator mechanism 10 move the objective lens 109 solidly so that a light flux emitted from the first semiconductor laser 101 may form an image on an information recording surface of the first optical disc 110.

Further, in FIG. 1, a light flux emitted from the second semiconductor laser 201 (wavelength $\lambda 2$=600 nm–700 nm) serving as a second light source is corrected by beam shaper 102 in terms of a beam shape and passes through first beam splitter 103 to become a parallel light flux while being stopped down by collimator 104 in terms of a diameter of the light flux, and passes through second beam splitter 105 to enter beam expanders (106 and 107). As stated above, the beam expanders (106 and 107) can correct chromatic aberration and spherical aberration. Incidentally, to the collimator 104 serving as a means to restrict the numerical aperture, there is given a dichroic coat, and by restricting an area for a light flux to pass through in accordance with a wavelength, the numerical aperture NA=0.65 of objective lens 109 is realized for a light flux emitted from the first semiconductor laser 101, for example, the numerical aperture NA=0.65 of objective lens 109 is realized for a light flux emitted from the second semiconductor laser 201 and the numerical aperture NA=0.45 of objective lens 109 is realized for a light flux emitted from the third semiconductor laser 301. However, a combination of the numerical apertures is not limited to the foregoing.

In FIG. 1, a light flux which has passed through beam expanders (106 and 107) passes through diaphragm 108 while keeping its form of a parallel light flux, and is converged, by objective lens 109 composed only of a refracting interface, on an information recording surface through a protective layer (thickness t2=0.5 mm–0.7 mm, preferably, 0.6 mm) of the second optical disc 110', to form a light-converged spot.

The light flux modulated by information pits and reflected on the information recording surface passes again through objective lens 109, diaphragm 108 and beam expanders (107 and 106), to be reflected on the second beam splitter 105, then, is given astigmatism by cylindrical lens 111, and passes through sensor lens 112 to enter a light-receiving surface of photodetector 113, and therefore, its output signals are used to obtain the scale reading of the information recorded on the first optical disc 110.

Further, changes in a quantity of light caused by changes in a form and a position of a spot on the photodetector 113 are detected to conduct focusing detection and tracking detection. Based on the detection, a focusing actuator (not shown) and tracking actuator 20 of objective lens actuator mechanism 10 move the objective lens 109 solidly so that a light flux emitted from the second semiconductor laser 201 may form an image on an information recording surface of the second optical disc 110'.

Further, when conducting recording and/or reproducing of information for third optical disc 110", lens holder 13 of the objective lens actuator mechanism 10 is rotated, and objective lens 209 is inserted in an optical path. Namely, in the present embodiment, objective lens 209 is used exclusively for the third optical disc 110".

In FIG. 1, a light flux emitted from the third semiconductor laser 301 (wavelength λ3=770 nm–830 nm) serving as a third light source passes through ¼ wavelength plate 202, then, passes through third beam splitter 203, and is reflected by first beam splitter 103, to become a parallel light flux while being stopped down by collimator 104 in terms of a diameter of the light flux, and passes through second beam splitter 105 to enter beam expanders (106 and 107) to be converted into a finite divergent light flux having an angle of divergence. In the same way as in the foregoing, beam expanders (106 and 107) can correct chromatic aberration and spherical aberration.

In FIG. 1, a light flux which has passed through beam expanders (106 and 107) passes through diaphragm 108 while keeping its form of a finite divergence, and is converged, by objective lens 209 composed only of a refracting interface, on an information recording surface through a protective layer (thickness t3=1.1 mm–1.3 mm, preferably, 1.2 mm) of the third optical disc 110", to form a light-converged spot.

The light flux modulated by information pits and reflected on the information recording surface passes again through objective lens 209, diaphragm 108, beam expanders (107 and 106), second beam splitter 105 and collimator 104 to be reflected on the first beam splitter 103, and then, is reflected on the third beam splitter 203, and is given astigmatism by cylindrical lens 204, and passes through sensor lens 205 to enter a light-receiving surface of photodetector 206, and therefore, its output signals are used to obtain the scale reading of the information recorded on the third optical disc 110".

Further, changes in a quantity of light caused by changes in a form and a position of a spot on the photodetector 206 are detected to conduct focusing detection and tracking detection. Based on the detection, a focusing actuator (not shown) and tracking actuator 20 of objective lens actuator mechanism 10 move the objective lens 209 solidly so that a light flux emitted from the third semiconductor laser 301 may form an image on an information recording surface of the third optical disc 110".

(Second Embodiment)

Figure 3:
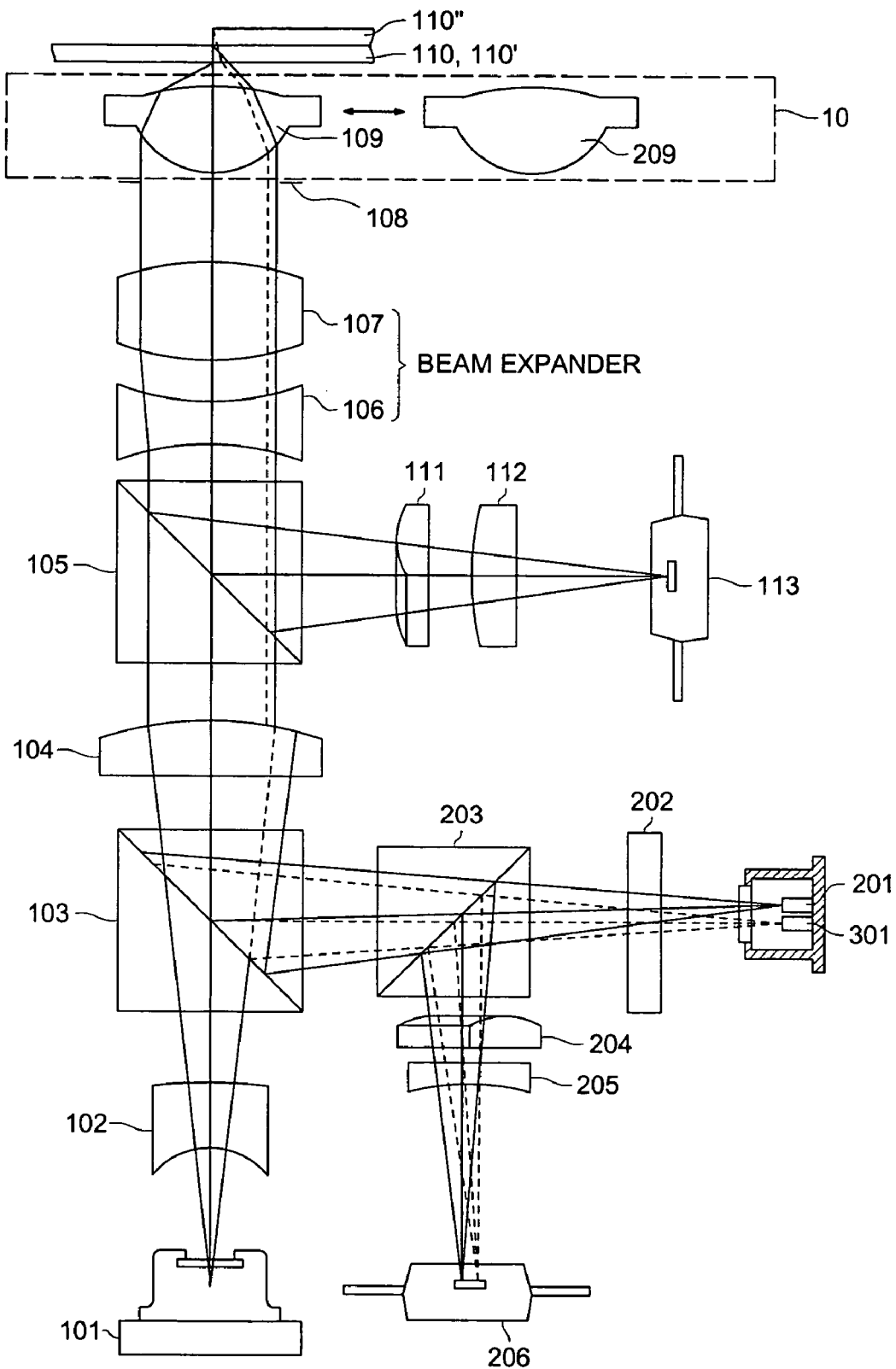
FIG. 3 is a schematic sectional view of an optical pickup device relating to the second embodiment.

FIG. 3 is a schematic structural diagram of an optical pickup device relating to the Second Embodiment. In the present embodiment, only when conducting recording and/or reproducing of information for the first optical disc 110, lens holder 13 of objective lens actuator mechanism 10 is rotated, and objective lens 109 is inserted into an optical path as shown in FIG. 3. Namely, in the present embodiment, the objective lens 109 is used exclusively for the first optical disc 110. Further, the second semiconductor laser 201 and the third semiconductor laser 301 are installed on the same base board to constitute a single unit that is called the so-called two-laser one package.

First, a light flux emitted from first semiconductor laser 101 (wavelength λ1=380 nm–450 nm) serving as a first light source is corrected by beam shaper 102 in terms of a beam shape, then, passes through first beam splitter 103, and is collimated by collimator 104 to be a parallel light flux, and after that, it passes through second beam splitter 105 and enters a beam expander having optical elements 106 and 107. Beam expanders (106 and 107) wherein at least one (preferably, optical element 106) can move in the direction of an optical axis have functions to change (enlarges, in this case) a diameter of a light flux of the parallel light flux, and to correct chromatic aberration and spherical aberration.

In FIG. 3, a light flux which has passed through beam expanders (106 and 107) passes through diaphragm 108, and is converged, by objective lens 109 representing an objective optical element composed only of a refracting interface, on an information recording surface through a protective layer (thickness t1=0.1 mm–0.7 mm) of the first optical disc 110 to form a light-converged spot. Incidentally, for the objective lens 109, it is possible to use an inexpensive plastic material as a material of the objective lens 109, although glass may also be used as a material, because deterioration by spherical aberration caused by environmental changes can be corrected optionally by beam expanders (106 and 107) and thereby a restriction for optical characteristics required can be eased.

The light flux modulated by information pits and reflected on the information recording surface passes again through objective lens 109, diaphragm 108 and beam expanders (107 and 106), to be reflected on the second beam splitter 105, then, is given astigmatism by cylindrical lens 111, and passes through sensor lens 112 to enter a light-receiving surface of photodetector 113, and therefore, its output signals are used to obtain the scale reading of the information recorded on the first optical disc 110.

Further, changes in a quantity of light caused by changes in a form and a position of a spot on the photodetector 113 are detected to conduct focusing detection and tracking detection. Based on the detection, a focusing actuator (not shown) and tracking actuator 20 of objective lens actuator mechanism 10 move the objective lens 109 solidly so that a light flux emitted from the first semiconductor laser 101 may form an image on an information recording surface of the first optical disc 110.

Further, when conducting recording and/or reproducing of information for the second optical disc 110' and the third optical disc 110", lens holder 13 of objective lens actuator mechanism 10 is rotated, and objective lens 209 is inserted into an optical path. Namely, in the present embodiment, the objective lens 209 is used for both of the second optical disc 110' and the third optical disc 110" in common.

In FIG. 3, a light flux emitted from the second semiconductor laser 201 (wavelength $\lambda 2$=600 nm–700 nm) serving as a second light source passes through ¼ wavelength plate 202, then, passes through third beam splitter 203, and is reflected by first beam splitter 103, to become a parallel light flux while being stopped down by collimator 104 in terms of a diameter of the light flux, and passes through second beam splitter 105 to enter beam expanders (106 and 107). The beam expanders (106 and 107) can correct chromatic aberration and spherical aberration. Incidentally, to the collimator 104 serving as a means to restrict the numerical aperture, there is given a dichroic coat, and by restricting an area for a light flux to pass through in accordance with a wavelength, the numerical aperture NA=0.65 of objective lens 209 is realized for a light flux emitted from the first semiconductor laser 101, for example, the numerical aperture NA=0.65 of objective lens 209 is realized for a light flux emitted from the second semiconductor laser 201 and the numerical aperture NA=0.45 of objective lens 209 is realized for a light flux emitted from the third semiconductor laser 301. However, a combination of the numerical apertures is not limited to the foregoing.

In FIG. 3, a light flux which has passed through beam expanders (106 and 107) is converted into the state of parallel light flux or weak divergent light flux, and passes through diaphragm 108 and is converged, by objective lens 209 composed only of a refracting interface, on an information recording surface through a protective layer (thickness t2=0.5 mm–0.7 mm, preferably, 0.6 mm) of the second optical disc 110', to form a light-converged spot.

The light flux modulated by information pits and reflected on the information recording surface passes again through objective lens 209, diaphragm 108, beam expanders (107 and 106), second beam splitter 105 and collimator 104 to be reflected on the first beam splitter 103, and then, is reflected on the third beam splitter 203, and is given astigmatism by cylindrical lens 204, and passes through sensor lens 205 to enter a light-receiving surface of photodetector 206, and therefore, its output signals are used to obtain the scale reading of the information recorded on the second optical disc 110'.

Further, changes in a quantity of light caused by changes in a form and a position of a spot on the photodetector 206 are detected to conduct focusing detection and tracking detection. Based on the detection, a focusing actuator (not shown) and tracking actuator 20 of objective lens actuator mechanism 10 move the objective lens 209 solidly so that a light flux emitted from the second semiconductor laser 201 may form an image on an information recording surface of the second optical disc 110'.

Further, in FIG. 3, a light flux emitted from the third semiconductor laser 301 (wavelength $\lambda 3$=770 nm–830 nm) serving as a third light source passes through ¼ wavelength plate 202, then, passes through third beam splitter 203, and is reflected by first beam splitter 103, to become a parallel light flux while being stopped down by collimator 104 in terms of a diameter of the light flux, and passes through second beam splitter 105 to enter beam expanders (106 and 107) where the light flux is converted into a finite divergent light flux having an angle of divergence that is stronger (greater) than that of the light flux emitted from the second semiconductor laser 201. In the same way as in the foregoing, beam expanders (106 and 107) can correct chromatic aberration and spherical aberration.

In FIG. 3, a light flux which has passed through beam expanders (106 and 107) passes through diaphragm 108 in the state of finite divergence having a stronger angle of divergence, and is converged, by objective lens 209 composed only of a refracting interface, on an information recording surface through a protective layer (thickness t3=1.1 mm–1.3 mm, preferably, 1.2 mm) of the third optical disc 110", to form a light-converged spot.

The light flux modulated by information pits and reflected on the information recording surface passes again through objective lens 209, diaphragm 108, beam expanders (107 and 106), second beam splitter 105 and collimator 104 to be reflected on the first beam splitter 103, and then, is reflected on the third beam splitter 203, and is given astigmatism by cylindrical lens 204, and passes through sensor lens 205 to enter a light-receiving surface of photodetector 206, and therefore, its output signals are used to obtain the scale reading of the information recorded on the third optical disc 110".

Further, changes in a quantity of light caused by changes in a form and a position of a spot on the photodetector 206 are detected to conduct focusing detection and tracking detection. Based on the detection, a focusing actuator (not shown) and tracking actuator 20 of objective lens actuator mechanism 10 move the objective lens 209 solidly so that a light flux emitted from the third semiconductor laser 301 may form an image on an information recording surface of the third optical disc 110".

(Third Embodiment)

Figure 4:
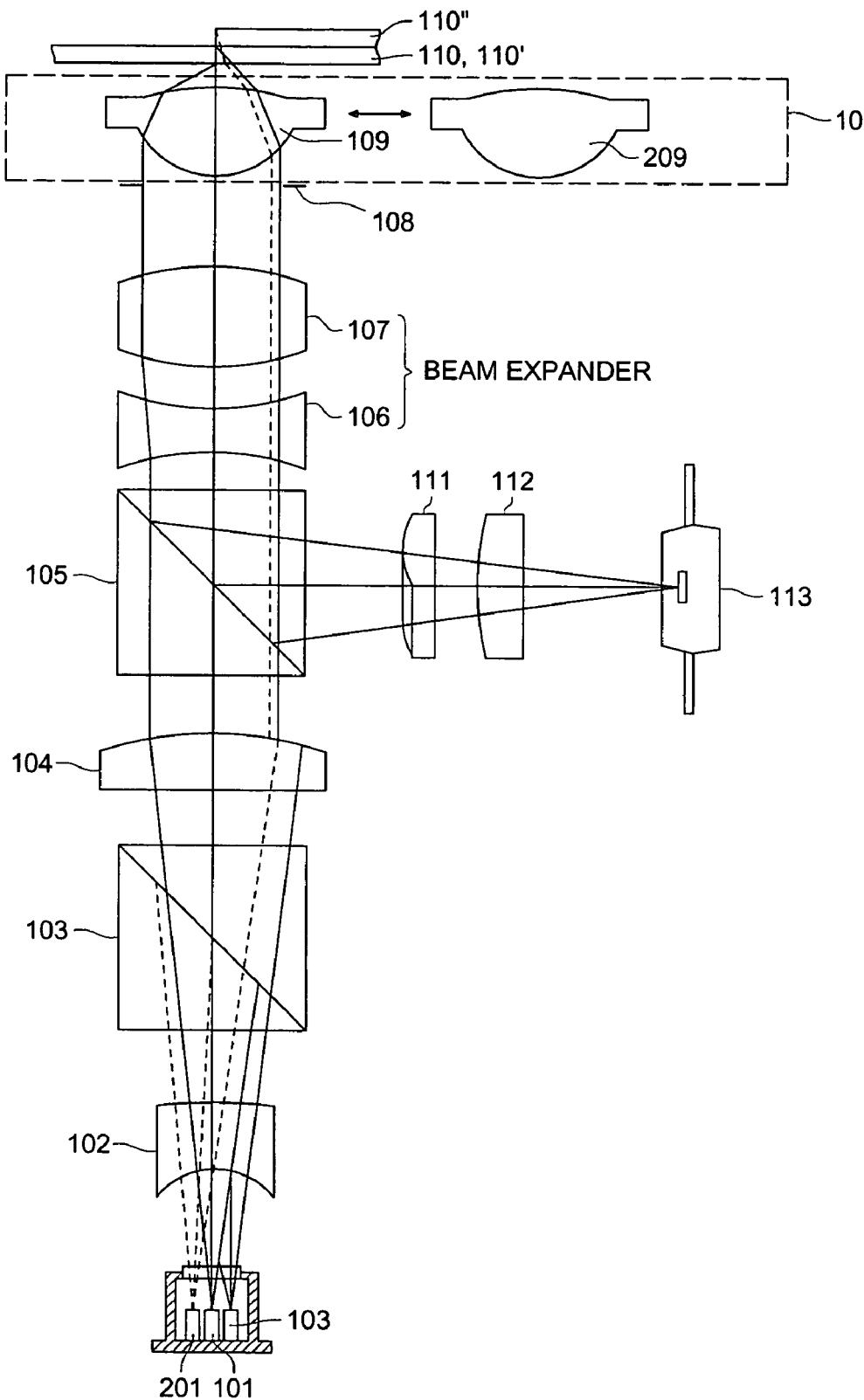
FIG. 4 is a schematic sectional view of an optical pickup device relating to the third embodiment.

FIG. 4 is a schematic structural diagram of an optical pickup device relating to the Third Embodiment. In the present embodiment, only when conducting recording and/or reproducing of information for the first optical disc 110, lens holder 13 of objective lens actuator mechanism 10 is rotated, and objective lens 109 is inserted into an optical path as shown in FIG. 4, and objective lens 209 is inserted into an optical path when conducting recording and/or reproducing of information for the second optical disc 110' and the third optical disc 110". Namely, in the present embodiment, the objective lens 109 is used exclusively for the first optical disc 110, and the objective lens 209 is used for both of the second optical disc 110' and the third optical disc 110" in common. However, it is also possible to make the objective lens 109 to be used in common for the first optical disc 110 and the second optical disc 110', and to make the objective lens 209 to be used exclusively for the third optical disc 110. Further, the second semiconductor laser 201 and the third semiconductor laser 301 are installed on the same base board to constitute a single unit that is called the so-called three-laser one package.

Each of light fluxes emitted respectively from first semiconductor laser 101, second semiconductor laser 201 and third semiconductor laser 301 is corrected by beam shaper 102 in terms of a beam shape, then, passes through first beam splitter 103, and is collimated by collimator 104 that is given a dichroic coat to become a parallel light flux, and after that, it passes through second beam splitter 105 and enters a beam expander having optical elements 106 and 107. Beam expanders (106 and 107) wherein at least one (preferably, optical element 106) can move in the direction of an optical axis have functions to change (enlarge, in this case) a diameter of a light flux of the parallel light flux, and to correct chromatic aberration and spherical aberration.

In FIG. 4, a light flux which has passed through beam expanders (106 and 107) passes through diaphragm 108, and is converged, by objective lens 109 or 209 composed only of a refracting interface, on an information recording surface through a protective layer of each of the first optical disc 110, the second optical disc 110' and the third optical disc 110", to form a light-converged spot.

Then, a light flux modulated by information pits and reflected on the information recording surface passes again through objective lens 109 or 209, diaphragm 108 and beam expanders (107 and 106), and then, is reflected on the second beam splitter 105, and is given astigmatism by cylindrical lens 111, and passes through sensor lens 112 to enter a light-receiving surface of photodetector 113, and therefore, its output signals are used to obtain the scale reading of the information recorded on the optical disc.

Further, changes in a quantity of light caused by changes in a form and a position of a spot on the photodetector 113 are detected to conduct focusing detection and tracking detection. Based on the detection, a focusing actuator (not shown) and tracking actuator 20 of objective lens actuator mechanism 10 move the objective lens 109 or 209 solidly so that a light flux emitted from the semiconductor laser may form an image on an information recording surface of the optical disc.

EXAMPLE 1

Example 1 described below is represented by an objective lens which is preferable as objective lens 109 of the optical pickup device shown in FIGS. 1 and 4. The objective lens in the Example 1 is one which is used exclusively for high density DVD, and is composed of two plastic lenses including a negative lens and a positive lens, wherein each of the two plastic lenses converges a light flux having a wavelength of 405 nm that has passed through a beam expander for changing a diameter of the light flux on an information recording surface of the optical disc through a protective layer with a thickness of 0.1 mm, and a focal length is 1.76 mm and a numerical aperture is 0.85. Lens data thereof are shown in Table 1. Incidentally, hereafter (including the lens data), it is assumed that the exponent of 10 (for example, $2.5 \times 10^{-3}$) is represented by E (for example, $2.5 \times E{-}3$).

TABLE 1

Example 1 Lens Data

| Surface No. | r(mm) | d(mm) | nλ | νd | Remarks |
|---|---|---|---|---|---|
| 0 | | ∞ | | | Light source |
| 1 | −3.6224 | 0.8000 | 1.52469 | 56.5 | Expander lens |
| 2 | 66.0162 | 0.6000 | | | |
| 3 | 21.5167 | 1.0000 | 1.52469 | 56.5 | |
| 4 | −5.2505 | 18.0000 | | | |
| 5 | 2.0966 | 2.5000 | 1.56013 | 56.5 | Objective lens |
| 6 | 6.2900 | 0.0500 | | | |
| 7 | 0.8880 | 1.1000 | 1.52469 | 56.3 | |
| 8 | ∞ | 0.2559 | | | |
| 9 | ∞ | 0.1000 | 1.61950 | 30.0 | Protective layer |
| 10 | ∞ | | | | |

Aspheric surface coefficient

| | First surface | Second surface | Third surface | Fourth surface |
|---|---|---|---|---|
| κ | −6.97814E−01 | 0.00000E+00 | −2.95711E+01 | −5.00803E−01 |
| A4 | −9.95924E−06 | 4.79783E−05 | −2.18911E−04 | −3.87717E−05 |
| A6 | 1.47066E−01 | 5.89417E−05 | 3.79034E−05 | 3.29108E−05 |
| A8 | 0.00000E+00 | 0.00000E+00 | 0.00000E+00 | 0.00000E+00 |
| A10 | 0.00000E+00 | 0.00000E+00 | 0.00000E+00 | 0.00000E+00 |
| A12 | 0.00000E+00 | 0.00000E+00 | 0.00000E+00 | 0.00000E+00 |
| A14 | 0.00000E+00 | 0.00000E+00 | 0.00000E+00 | 0.00000E+00 |
| A16 | 0.00000E+00 | 0.00000E+00 | 0.00000E+00 | 0.00000E+00 |

Aspheric surface coefficient

| | Fifth surface | Sixth surface | Seventh surface |
|---|---|---|---|
| k | −1.68114E−01 | 4.86250E+00 | −8.09269E−01 |
| A4 | −4.68333E−03 | −2.21547E−03 | 1.16941E−01 |
| A6 | 6.11061E−04 | 1.75411E−02 | 2.88743E−02 |
| A8 | −9.46597E−04 | −9.51333E−03 | 1.27454E−01 |
| A10 | 2.33843E−04 | −1.79513E−02 | −8.77260E−02 |
| A12 | −1.55675E−04 | 8.98785E−03 | 0.00000E+00 |
| A14 | 6.63819E−05 | 0.00000E+00 | 0.00000E+00 |
| A16 | −1.88569E−05 | 0.00000E+00 | 0.00000E+00 |

An aspheric surface of the objective lens of this kind can be expressed by the following Numeral 1 when the direction of an optical axis is represented by X axis, a height in the direction perpendicular to the optical axis is represented by h and a radius of curvature of an optical surface is represented by r. Incidentally, κ represents a conic constant and $A_{2i}$ represents an aspheric surface coefficient.

$$X = \frac{h^2/r}{1+\sqrt{1-(1+\kappa)h^2/r^2}} + \sum_{i=2} A_{2i}h^{2i} \quad \text{Numeral 1}$$

Incidentally, with respect to objective lens 209 in FIG. 1 which is used for DVD and CD in common, it will not be described in detail because it is known widely as one described in TOKKAIHEI No. 2002-203331.

EXAMPLE 2

Example 2 described below is represented by an objective lens which is preferable as objective lens 109 of the optical pickup device shown in FIG. 3. Its lens data are shown in Table 2. The objective lens in the Example 2 is one which is used in common for high density DVD and DVD, and has a form of a sectional view shown in FIG. 5. Namely, the present objective lens includes, on optical surface S1, central area 1 including an optical axis, intermediate area 2 which is formed around the central area 1 to be a step and peripheral area 3 formed around the intermediate area 2, and a diffractive structure is formed on the peripheral area 3. When high density DVD is used, the light flux which has passed through the central area 1 and the peripheral area 3 is used to conduct recording and/or reproducing of information, while, when DVD is used, the light flux which has passed through the central area 1 and the intermediate area 2 is used to conduct recording and/or reproducing of information.

TABLE 2

Example 2 Lens Data

|  |  | High density DVD |  | DVD |  |
| --- | --- | --- | --- | --- | --- |
| Focal length of objective lens |  | $f_1$ = 2.4 mm |  | $f_2$ = 2.46 mm |  |
| Numerical aperture on image surface side |  | NA1: 0.65 |  | NA2: 0.65 |  |
| Diffraction order |  | Tertiary diffraction |  | Secondary diffraction |  |

| $i^{th}$ sur- face | ri | di (407 nm) | ni (407 nm) | di (655 nm) | ni (655 nm) |  |
| --- | --- | --- | --- | --- | --- | --- |
| 0 |  | 12.79 |  | ∞ |  |  |
| 1 | ∞ | 0.0 | 1.0 | 0.0 | 1.0 | Diaphragm diameter 3.192 mm |
| 2 | 1.54227 | 1.60000 | 1.542771 | 1.60000 | 1.52915 |  |
| 2' | 2.09495 | 0.15126 | 1.542771 | 0.15126 | 1.52915 |  |
| 3 | −5.85469 | 1.14000 | 1.0 | 1.07000 | 1.0 |  |
| 4 | ∞ | 0.6 | 1.61869 | 0.6 | 1.57752 |  |
| 5 | ∞ |  |  |  |  |  |

The symbol d2' represents displacement from the second surface to the $2^{th}$ surface.

Aspheric surface data

Second surface
(0 < h < 1.56 mm: Common area for high density DVD and DVD)

| Aspheric surface coefficient | κ | −7.6953 × E−1 |  |  |
| --- | --- | --- | --- | --- |
|  | A1 | +8.4000 × E−3 | P1 | 4.0 |

TABLE 2-continued

|  | A2 | −9.2000 × E−4 | P2 | 6.0 |
| --- | --- | --- | --- | --- |
|  | A3 | +1.6657 × E−3 | P3 | 8.0 |
|  | A4 | −7.3116 × E−4 | P4 | 10.0 |
|  | A5 | +2.3051 × E−4 | P5 | 12.0 |
|  | A6 | −5.7188 × E−5 | P6 | 14.0 |
| Optical path difference function ($\lambda_B$ = 1 mm) | C2 | −2.6573 × E−0 |  |  |
|  | C4 | −1.0803 × E−0 |  |  |
|  | C6 | −2.5559 × E−1 |  |  |
|  | C8 | +8.6007 × E−2 |  |  |
|  | C10 | −2.9751 × E−2 |  |  |

$2^{th}$ surface (1.56 mm < h: DVD area)

| Aspheric surface coefficient | κ | −4.0617 × E−0 |  |  |
| --- | --- | --- | --- | --- |
|  | A1 | −5.2846 × E−3 | P1 | 4.0 |
|  | A2 | +6.8538 × E−3 | P2 | 6.0 |
|  | A3 | +2.5685 × E−2 | P3 | 8.0 |
|  | A4 | +7.6026 × E−3 | P4 | 10.0 |
|  | A5 | −5.6376 × E−4 | P5 | 12.0 |
|  | A6 | +1.9688 × E−4 | P6 | 14.0 |
| Optical path difference function ($\lambda_B$ = 1 mm) | C2 | −3.5650 × E+1 |  |  |
|  | C4 | +6.2611 × E−0 |  |  |
|  | C6 | +3.8905 × E−0 |  |  |
|  | C8 | +1.1623 × E−0 |  |  |
|  | C10 | −9.3398 × E−1 |  |  |

Third surface

| Aspheric surface coefficient | κ | −7.5809 × E+1 |  |  |
| --- | --- | --- | --- | --- |
|  | A1 | −2.8052 × E−3 | P1 | 4.0 |
|  | A2 | +1.3670 × E−2 | P2 | 6.0 |
|  | A3 | −9.5656 × E−3 | P3 | 8.0 |
|  | A4 | +1.7676 × E−3 | P4 | 10.0 |
|  | A5 | +2.9457 × E−4 | P5 | 12.0 |
|  | A6 | −1.1557 × E−4 | P6 | 14.0 |

In the objective lens of this kind, a diffractive structure formed on the optical surface is expressed by the optical path difference given to the transmission wavefront by the diffractive structure. The optical path difference of this kind is expressed by optical path difference function $\Phi_b$ (mm) that is defined by the following Numeral 2 when h represents a height in the direction perpendicular to an optical axis, m represents the diffraction order, λ represents a working wavelength (wavelength for emission from a semiconductor laser), $\lambda_B$ represents a blazed wavelength and C represents a coefficient of an optical path difference function.

$$\Phi_b = m \times \frac{\lambda}{\lambda_B} \times \sum_{i=1}^{5} C_{2i}h^{2i} \quad \text{Numeral 2}$$

Incidentally, with respect to objective lens 209 in FIGS. 3 and 4 which is used for CD exclusively, it will not be described in detail because it is known widely.

Further, in the optical pickup device in FIGS. 1, 3 and 4, it is also possible to make the objective lens 109 to be one with characteristics capable of conducting properly recording and/or reproducing of information for both of two types of high density DVDs (one is the first optical information recording medium wherein a thickness of a protective layer t1 is 0.1 mm, and the other is the fourth optical information recording medium wherein a thickness of a protective layer t4 is 0.6 mm).

The invention has been explained above, referring to the embodiments, and the invention should not be construed to be limited to the aforementioned embodiments, and it can naturally be modified and improved properly. For example, the objective lens actuator device may also be of the structure wherein lens holder 13' holding two objective lenses 109 and 209 is slid straight in the direction perpendicular to an optical axis by linear actuator 30 as shown in FIG. 6, without being limited to the structure shown in FIG. 2. Further, in the structure shown in FIGS. 2 and 6, lens holders 13 and 13' do not need to be solid, and separate members holding respectively objective lens 109 and objective lens 209 may be moved independently so that the objective lens on one side may be inserted in an optical path of the light-converging optical system.

Figure 7:
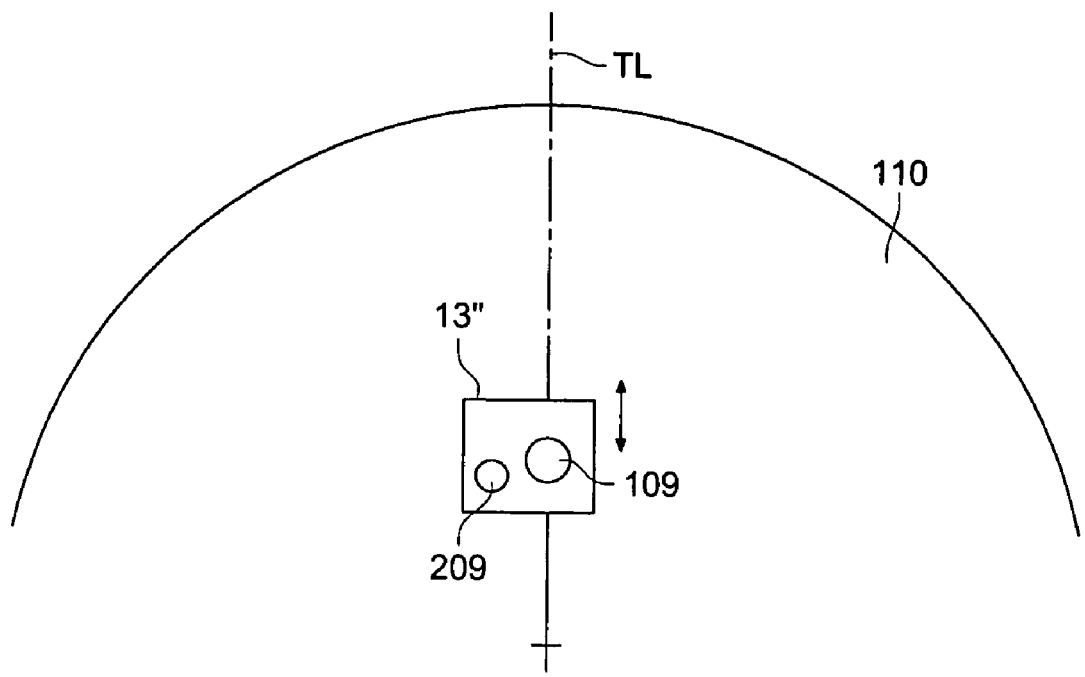
FIG. 7 is a schematic perspective view of still another objective lens actuator device.

Further, as shown in FIG. 7, lens holder 13" holding two objective lenses 109 and 209 is made to move only in the tracking direction of optical disc 110, and at least objective lens 109 for high density DVD is made to be positioned on tracking line TL, thus, recording and/reproducing of high density information is made to be possible. Incidentally, objective lens 209 for DVD and/or CD has room in terms of design, and therefore, it makes it possible to conduct recording and/or reproducing of appropriate information, even when it is located at the position deviated from tracking line TL. The objective lens may also be composed of plural elements without being limited to a single element, and various materials such as glass and plastic may also be used for the material thereof.

The invention make it possible to provide an optical pickup device that can conduct recording and/or reproducing of information properly for all of high density DVD, conventional DVD and CD, for example.

What is claimed is:

1. An optical pickup apparatus, comprising:
   first, second and third light sources to emit light fluxes with wavelengths of $\lambda 1$, $\lambda 2$ ($\lambda 1<\lambda 2$) and $\lambda 3$ ($\lambda 2<\lambda 3$) respectively;
   a light converging optical system including a first objective optical element and a second objective optical element, wherein the first objective optical element converges the light flux emitted from the first light source on a first information recording surface having a first information recording density D1 of the first optical information recording medium through a protective layer with a thickness t1 so as to record and/or reproduce information,
   the second objective optical element converges the light flux emitted from the third light source on a third information recording surface having a third information recording density D3 (D1>D3) of the third optical information recording medium through a protective layer with a thickness t3 (t1<t3) so as to record and/or reproduce information, and
   the first objective optical element or the second objective optical element converges the light flux emitted from the second light source on a second information recording surface having a second information recording density D2 (D1>D2>D3) of the second optical information recording media through a protective layer with a thickness t2 (t2<t3) so as to record and/or reproduce information;
   a lens holder holding the first objective optical element and second objective element therein; and
   a chromatic aberration correcting element which is arranged in an optical path where the light flux emitted by the first light source passes through, and corrects a chromatic aberration caused by a wavelength variation in a light flux emitted by the first light source.

2. The optical pickup apparatus of claim 1, wherein the light flux emitted by the first light source enters into the first objective optical element as a parallel light flux.

3. The optical pickup apparatus of claim 2, wherein the light flux emitted by the second light source enters into one of the first objective optical element and the second objective optical element as a parallel light flux.

4. The optical pickup apparatus of claim 3, wherein the light flux emitted by the second light source is incident into the first objective optical element as a parallel light flux.

5. The optical pickup apparatus of claim 4, wherein the light flux emitted by the third light source is incident into the second objective optical element as a parallel light flux.

6. The optical pickup apparatus of claim 3, wherein the light flux emitted by the second light source is incident into the second objective optical element as a parallel light flux.

7. The optical pickup apparatus of claim 6, wherein the light flux emitted by the third light source is incident into the second objective optical element as a parallel light flux.

8. The optical pickup apparatus of claim 6, wherein the light flux emitted by the third light source is incident into the second objective optical element as a divergent light flux.

9. The optical pickup apparatus of claim 2, wherein the light flux emitted by the second light source is incident into the second objective optical element as a divergent light flux.

10. The optical pickup apparatus of claim 9, wherein the light flux emitted by the third light source is incident into the second objective optical element as a divergent light flux.

11. The optical pickup apparatus of claim 10, wherein a diverging angle in case that the light flux emitted by the second light source is incident into the second objective optical element is larger than a diverging angle in case that the light flux emitted by the third light source is incident into the second objective optical element.

12. The optical pickup apparatus of claim 1, wherein the chromatic aberration correcting element comprises at least one of a diffractive structure, phase structure and multi-level structure on at least one of optical surfaces.

13. The optical pickup apparatus of claim 12, wherein the chromatic aberration correcting element comprises a diffractive structure on at least one of optical surfaces.

14. The optical pickup apparatus of claim 1, wherein the lens holder has a structure which is adapted to selectively insert one of the first objective optical element and second objective optical element into an optical path of the light converging optical system.

15. The optical pickup apparatus of claim 1, wherein the lens holder holds the first objective optical element and the second objective optical element not to change a relative displacement thereof.

16. The optical pickup apparatus of claim 1, wherein the lens holder holds the first objective optical element and the second objective optical element to change a relative displacement thereof.

17. The optical pickup apparatus of claim 14, wherein the lens holder rotates about an axis parallel to the optical axis of the light converging optical system.

18. The optical pickup apparatus of claim 14, wherein the lens holder is moved across the optical axis.

19. The optical pickup apparatus of claim 1, wherein the first, second and third light sources are arranged individually on different substrates.

20. The optical pickup apparatus of claim 1, wherein the first light source and the second light source are arranged on the same substrate.

21. The optical pickup apparatus of claim 20, wherein the second light source and the third light source are arranged on the same substrate.

22. The optical pickup apparatus of claim 1, wherein the first objective optical element is a single optical element.

23. The optical pickup apparatus of claim 22, wherein the second objective optical element is a single optical element.

24. The optical pickup apparatus of claim 1, wherein the first objective optical element is a plurality of optical elements.

25. The optical pickup apparatus of claim 24, wherein the second objective optical element is a plurality of optical elements.

26. The optical pickup apparatus of claim 1, wherein at least one of the first objective optical element and the second objective optical element is formed by a glass material.

27. The optical pickup apparatus of claim 1, wherein at least one of the first objective optical element and the second objective optical element is formed by a plastic material.

28. The optical pickup apparatus of claim 27 comprising a numerical aperture changing element to change a numerical aperture of the objective optical element according to the type of recording media.

29. The optical pickup apparatus of claim 1 comprising spherical aberration correcting element to suppress a spherical aberration deterioration caused by a temperature fluctuation in the objective optical element.

30. The optical pickup apparatus of claim 1, wherein the first information recording medium satisfies the following formula:

$$0.09 \text{ mm} \leq t1 \leq 0.11 \text{ mm}$$

where t1 is a thickness of the protective layer of the first information recording medium.

31. The optical pickup apparatus of claim 30, wherein the light flux emitted from the first light source passes through the first objective optical element and converges on a fourth information recording surface having a fourth information recording density D4 (D4>D2) of the fourth optical information recording media through a protective layer with a thickness t4 (0.55 mm≦t4≦0.65 mm) so as to record and/or reproduce information.

32. The optical pickup apparatus of claim 1, wherein the first optical information recording medium satisfies the following formula:

$$0.55 \text{ mm} \leq t1 \leq 0.65 \text{ mm}$$

where t1 is a thickness of the protective layer of the first optical information recording medium.

* * * * *